United States Patent
Bryan

(10) Patent No.: US 7,089,835 B2
(45) Date of Patent: Aug. 15, 2006

(54) SYSTEM AND METHOD FOR FORMING A NON-ROTATIONALLY SYMMETRIC PORTION OF A WORKPIECE

(75) Inventor: James B. Bryan, Pleasanton, CA (US)

(73) Assignee: CDM Optics, Inc., Boulder, CO (US)

( * ) Notice: Subject to any disclaimer, the term of this patent is extended or adjusted under 35 U.S.C. 154(b) by 356 days.

(21) Appl. No.: 10/612,208

(22) Filed: Jul. 2, 2003

(65) Prior Publication Data
US 2004/0003689 A1 Jan. 8, 2004

Related U.S. Application Data

(60) Provisional application No. 60/394,175, filed on Jul. 3, 2002.

(51) Int. Cl.
B23B 7/14 (2006.01)
(52) U.S. Cl. .............................. 82/1.11; 82/100; 82/118
(58) Field of Classification Search .................. 82/100, 82/101, 1.11, 70.1, 118, 119, 120, 121, 122
See application file for complete search history.

(56) References Cited

U.S. PATENT DOCUMENTS 4,343,206 A * 8/1982 Douglass et al. ............. 82/117
5,347,763 A * 9/1994 Miyamato et al. .......... 451/241
6,122,999 A * 9/2000 Durazo et al. ................ 82/1.11
6,237,452 B1 * 5/2001 Ludwick et al. ............... 82/12
6,415,191 B1 * 7/2002 Pryor ........................... 700/95

* cited by examiner

Primary Examiner—Willmon Fridie, Jr.
(74) Attorney, Agent, or Firm—Lathrop & Gage LC

(57) ABSTRACT

A method and control system for forming workpiece surfaces with at least a portion being non-rotationally symmetric (i.e., axis asymmetric) is provided. In one aspect, a slow tool servo system is provided to fabricate a surface having at least an axis asymmetric portion, and optionally, a superimposed axis symmetric asphere or spherical portion. A workpiece is mounted on a spindle and a tool is mounted to a translatable tabletop surface. The z position of the contact point of the workpiece and working tool is determined as a function of the x position of the same contact point and as a function of the angle of rotation of the spindle about the spindle axis. By making the z position of the contact point a function of both the angle of spindle rotation and the x position, the lateral and longitudinal position of the working tool can be moved at designated spindle rotation angles to form a surface having both axis asymmetric and axis symmetric asphere or spherical portions.

19 Claims, 4 Drawing Sheets

SYSTEM AND METHOD FOR FORMING A NON-ROTATIONALLY SYMMETRIC PORTION OF A WORKPIECE

RELATED APPLICATION

This application is the nonprovisional application of provisional application Ser. No. 60/394,175, Jul. 3, 2002 entitled SYSTEM AND METHOD FOR FORMING A NON-ROTATIONALLY SYMMETRIC PORTION OF A WORKPIECE, the aforementioned application is incorporated herein by reference thereto.

BACKGROUND OF THE INVENTION

This invention relates generally to the machining of surfaces, and more particularly, to a method and apparatus for forming axis asymmetric workpiece surfaces.

Description of the Related Art

Machines for fabricating high-tolerance surfaces are known, such as lathes that utilize diamond turning and grinding tools. Typically, a workpiece made of a metal, glass, or synthetic material is secured in a chuck of a lathe spindle and brought into contact with a diamond cutting tool or grinding wheel (referred to hereinafter as a "tool"). A tool holder mounted on a tabletop surface, which is either stationary, rotatably mounted, or slidably mounted to a base of the machine, holds this tool. The machine may be configured such that either the spindle holding the workpiece or the tool is movable relative to the base. Movement of the tool is typically horizontal in both the transverse x-axis and longitudinal z-axis, the z-axis being parallel to axis of rotation of the spindle.

In a common application, the tool is used to create an axis symmetric sphere or aspherical surface on a workpiece. For example, the aspherical surface may have a parabolic or cone shape such that the z-position of the working tool is a function of the x-position. These aspherical shapes are of interest particularly in the optical industry for minimizing the number of optical elements in a system. For example, axis asymmetric surfaces are used in a special purpose optical mask for an incoherent optical imaging system to increase depth of field. This makes it possible for digital processing to produce an image with an in-focus resolution over a large range of misfocus by digitally processing the resulting intermediate image. The mask causes the optical transfer function to remain essentially constant within some range away from the in-focus position. The digital processing undoes the optical transfer function modifying effects of the mask, resulting in the high resolution of an in-focus image over an increased depth of field.

Fast tool servos in conjunction with precision diamond turning machines are widely used for machining axis asymmetric workpiece surfaces. The rapid movement of the tool along either the x- or z-axes by the fast tool servo facilitates machining of the workpiece in a minimal amount of time. The utilization of fast tool servos, however, presents a number of problems. Vibration is encountered with the rapidly moving parts of the fast tool servo, necessitating the need of dampening systems for attenuation of these vibrations. The current used to actuate the piezo-electric crystals of the fast tool servo generates excessive heat. This heat is created in the immediate area of the tool and affects the accuracy of the system.

Additionally, certain non-diamond turnable workpiece materials, such as glass, tool steel, and tungsten carbide must be ground using a high speed, motorized, air-bearing grinding spindle to achieve the desired shape. These spindles weigh approximately 50 pounds or more. It is not feasible to mount these spindles on a fast tool servo because of high inertia levels, and further because of their requirements for utilities such as electrical power, compressed air, and cooling water.

Another problem with fast tool servos is that the effective rake angle (the angle between the top of the tool and the workpiece surface) changes as a consequence of the changing circumferential slope of the axis asymmetric "potato chip" workpiece surface. If this changing rake angle is small, less than approximately plus or minus five degrees, there is negligible change in the cutting conditions. If, however, the changing rake angles are large, the cutting forces will change significantly and cause instability of the cut and bad surface finishes. A high-speed, motorized, air-bearing spindle may be used to rotate the diamond tool, sometimes referred to as "flycutting," which would solve this problem since the effective rake angle is constant regardless of the changing circumferential slopes of the workpiece. The flycutting spindle, however, is almost identical in weight to the grinding spindle and thus cannot be mounted on a fast tool servo due to its mass and utility requirements.

Another problem with fast tool servos is their limited travel. Typically, 0.050 inches is generally the limit of travel.

Slow tool servos have not been used to create a symmetric axis sphere or aspherical surface on a workpiece. In order to create this surface, the slow tool servo would have to sinusoidally oscillate the large masses associated with conventional slide systems that typically weigh five hundred pounds. The fast tool servo only required oscillation of the diamond tool itself, which typically weighs one ounce. The frequency response of a linear slide system depends on the force available from the slide drive, the z-slide travel that is required, and the weight of the assembly to be oscillated. A force of one hundred pounds is sufficient to oscillate five hundred pounds through a distance of 0.040 inches at a frequency response of ten cycles per second. In order to accommodate this relatively low frequency response of the z-axis slide, the workpiece spindle must be rotated much slower than is customary on conventional diamond turning machines. For example, if the potato chip surface has ten circumferential undulations, and the frequency response of the z-slide is ten cycles per second, the spindle must be slowed to one revolution per second or sixty revolutions per minute, which is typically a cause of concern. The relatively low cutting velocity associated with these low spindle speeds, however, is not a problem in diamond turning of diamond turnable materials, since there is no "built-up-edge" and no sensitivity of the surface finish to cutting velocity.

Another problem with a slow tool servo is that the relatively low spindle speed leads to relatively long cycle times. However, workpieces that are used as molds for injection molding machines can produce millions of parts per month. Thus the relatively low output for slow tool servos is acceptable. This is particularly true for workpieces that cannot be produced with fast tool servos because they are made of materials that must be ground, or because they have large circumferential slopes.

SUMMARY OF INVENTION

The present invention overcomes the obstacles associated with the use of fast tool servos to create an axis symmetric sphere or aspherical surface on a workpiece. The present invention is a slow tool servo having x- and z-axis linear slide drives and feedback systems as is typical of a conventional, axis symmetric, diamond turning and grinding machine. This conventional axis symmetric system is modified to include an encoder to the workpiece spindle to provide angular position feedback and one of a flycutter and grinding spindle assembly. A control system is programmed such that the z-axis slide moves as a function of the c-axis workpiece spindle position as well as the x-axis linear position.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE PREFERRED EMBODIMENT

Figure 1:
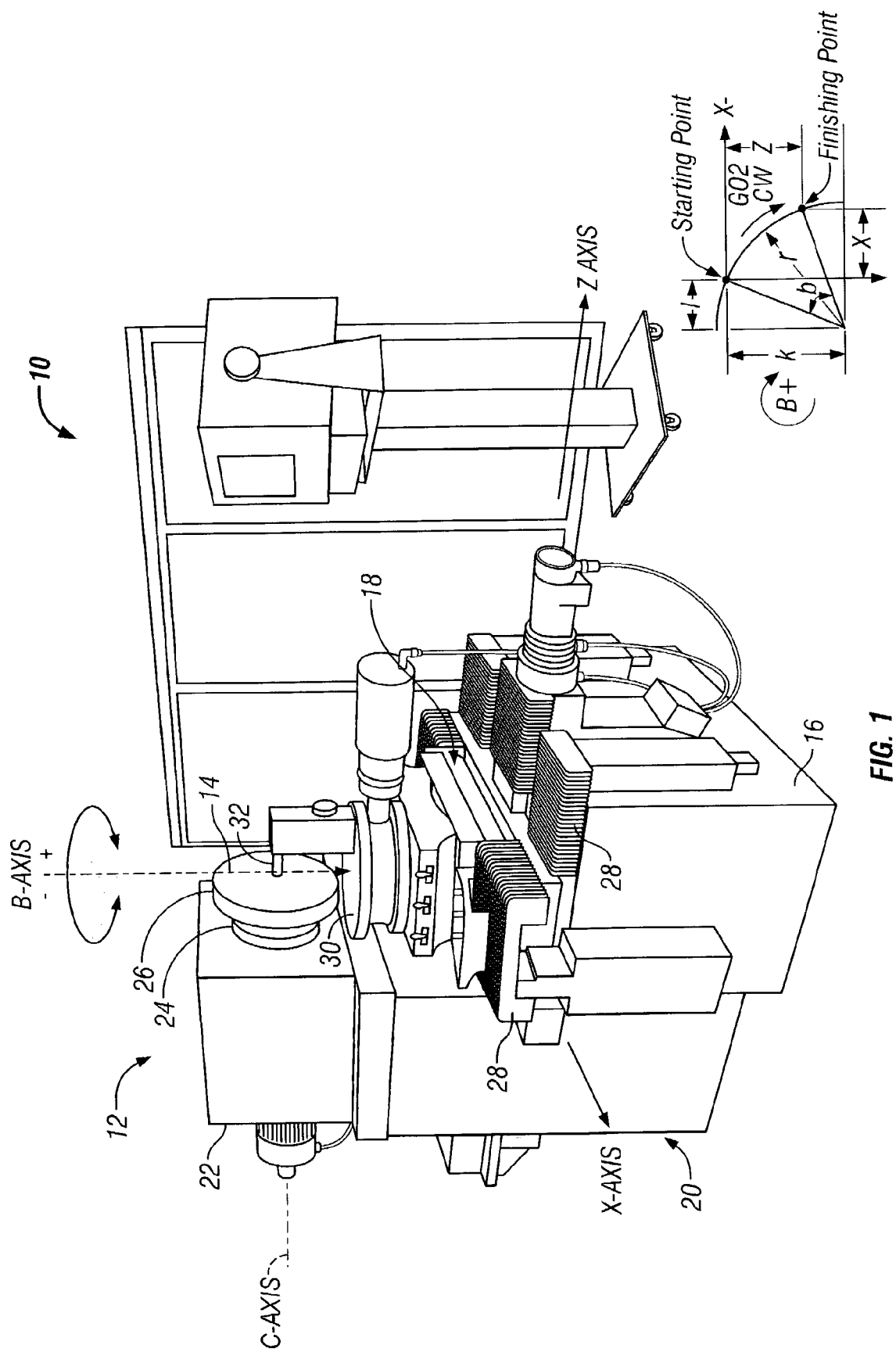
FIG. 1 is a perspective view of a conventional machine assembly configured for use with the system of the present invention.

The system of the present invention is shown in use in FIG. 1 with an exemplary machine for forming shaped workpiece surfaces. The system 10 comprises a diamond turning or grinding machine 12 that is provided with associated programming instructions and controls to facilitate the fabrication of an axis asymmetric portion of a workpiece surface 14. The machine 12 generally has a base 16 upon which a platform 18 is slidably mounted and a spindle base 20 upon which a spindle assembly 22 is rotatably mounted. The spindle assembly 22 has a workpiece chuck 24, such as a vacuum chuck, for securely holding a workpiece 26 for rotation. Preferably, the chuck 24 rotates about a horizontal c-axis. The platform 18 of the machine is movable along linear slides 28 that extend along horizontal x- and z-axes orthogonal to one another, the z-axis being parallel to the c-axis. A table 30 is mounted to the platform 18 and one of a working tool 32 (e.g., a diamond cutting tool) or grinding spindle wheel (not shown) is mounted to the table 30. Preferably, the table 30 is a rotary table mounted to the platform 18 to rotate about a vertically extending b-axis orthogonal to the x- and z-axes. In this manner tool 32 is in perpendicular relation to the workpiece surface.

Figure 2:
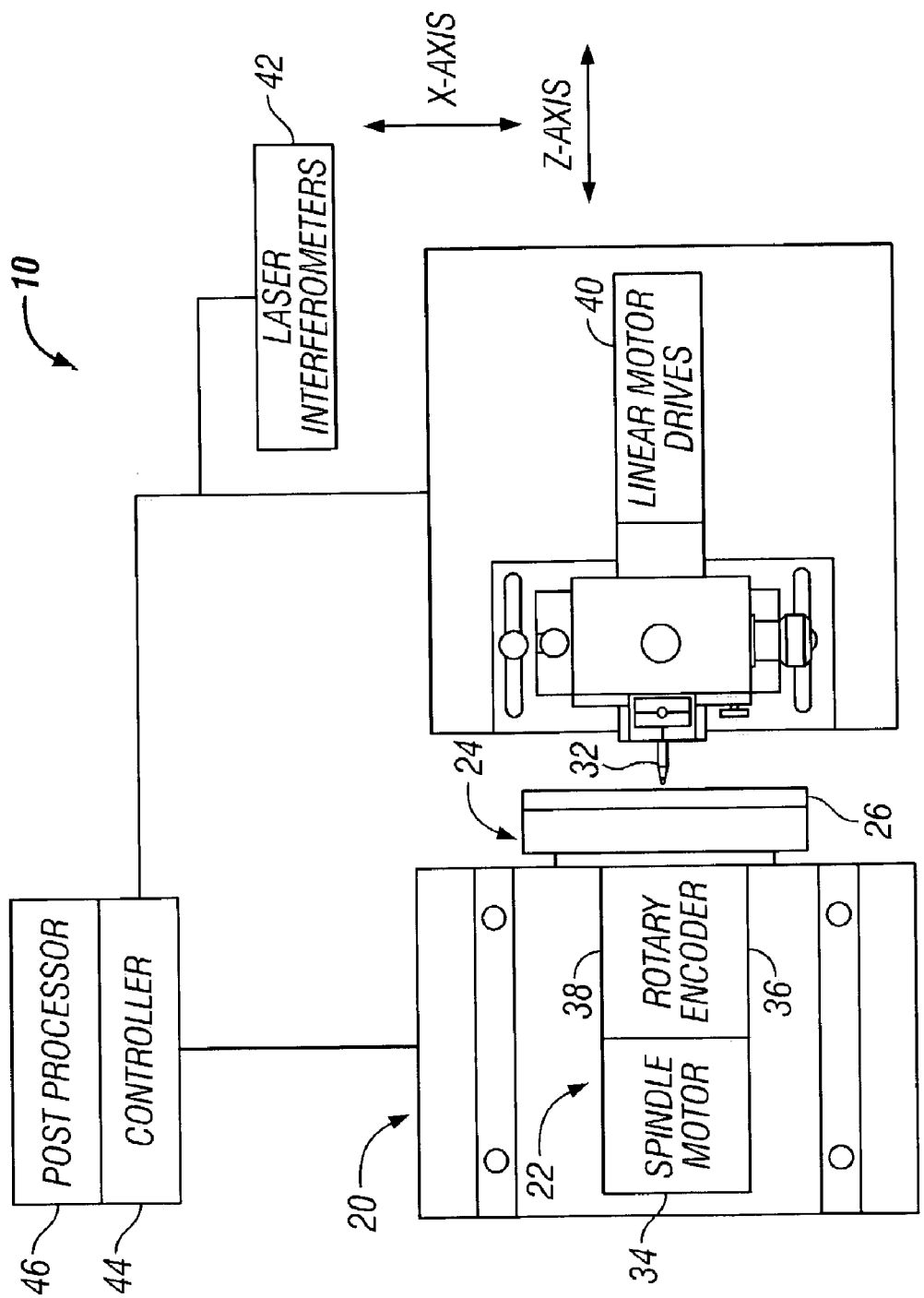
FIG. 2 is a top pan view, partially in schematic form, of the machine assembly configured for use with the system of the present invention.

FIG. 2 presents an illustration of the system 10 whereby various components of the present invention are shown schematically. The spindle assembly 22 is provided with a motor 34 for driving the spindle 24 and a rotary encoder 36 to sense its angular position. Linear motor drives 40 move the platform 18 in the x-axis and z-axis directions along the linear slides 28 to position the working tool 32 for shaping the workpiece surface 14. The linear slide drive systems may be acme leadscrews, ball bearing leadscrews, rack-and-pinion drives, traction drives, linear motors or similar devices. The linear slide position feedback systems may be rotary encoders on leadscrews, linear encoders made of glass or steel, magnetic scales, laser interferometers, or similar devices. In FIG. 2, laser interferometers 42 determine the linear x-position, and the linear z-position of a leading edge of the tool 32.

A controller 44 receives the linear and angular position information from the laser interferometers 42 and rotary encoder 36. The controller 44 communicates with a post processor 46 that utilizes standard numeric control programming. The post processor 46 takes inputted surface equations for the workpiece 26, which may be pre-programmed or added by the user, and knowing the linear and angular position variables, calculates a single point tool 32 centerline path, as well as a grinding spindle centerline path if provided. In this way, the tool 32 z-position is determined as a function of the measured x-position and the spindle angular position. The calculation by the post processor 46 is then converted by the controller 44 to a command signal for the linear motor drives 40 to move the tool 32.

Figure 3:
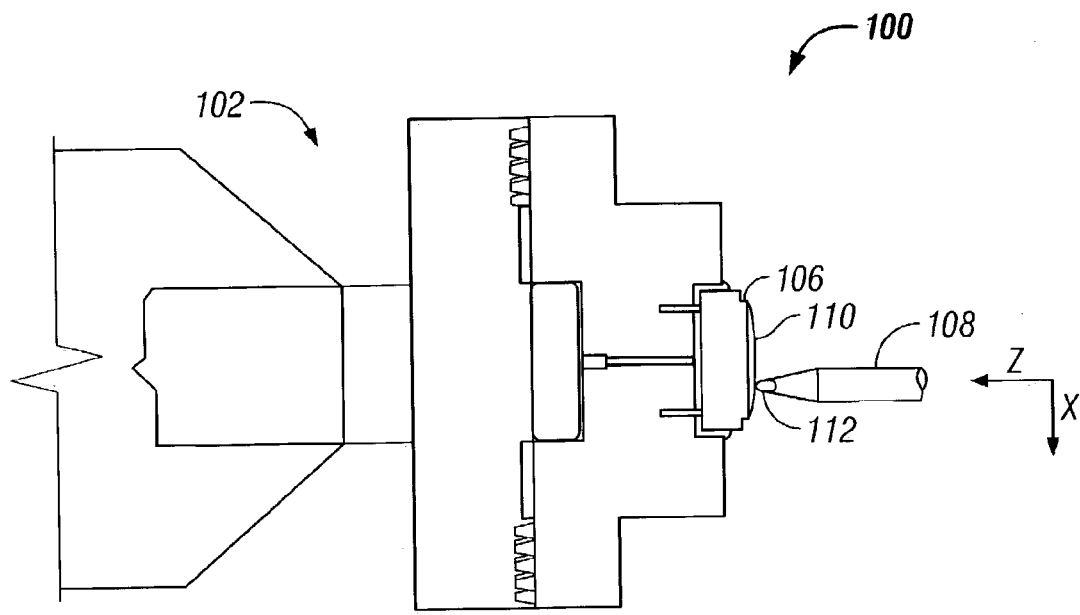
FIG. 3 is a top plan view of a conventional system for diamond turning axis symmetric surfaces.

The conventional method for controlling a tool to machine axis symmetric workpieces is depicted in FIG. 3. The machine 100 is shown with a c-axis spindle assembly 102 having a workpiece chuck 104 for securely holding a workpiece 106 for rotation, and a tool 108 for shaping a surface 110 of the workpiece. According to this method, the z-position of a leading edge 112 of the tool 108 is designated as a function of the tool x-position, or $z=f(x)$. Thus, the working tool 108 forms the surface 110 into a sphere or asphere (e.g., parabola) that is symmetric about the spindle c-axis. Asymmetry about the spindle axis is not achieved because the z-position is not varied based on the relative angle of rotation of the spindle and workpiece.

Figure 4:
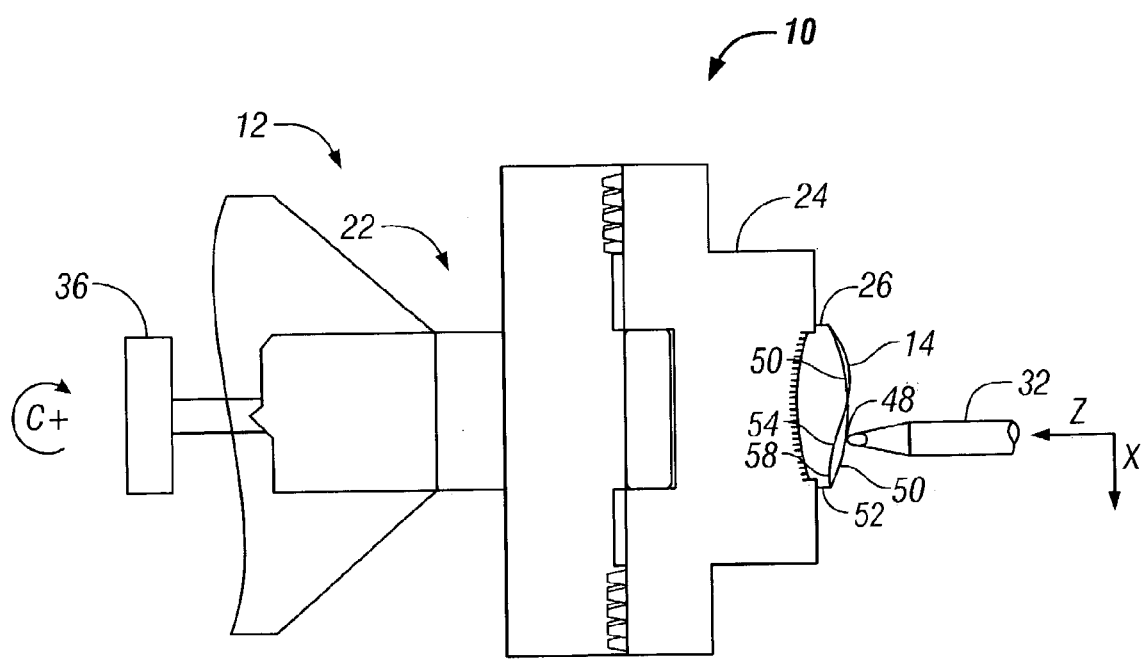
FIG. 4 is a top plan view of a conventional system modified according to a method of the present invention.

FIG. 4 shows the system 10 of the present invention operating in accordance with the method taught herein. The machine 12 is shown with the c-axis spindle assembly 22 having the workpiece chuck 24 for securely holding the workpiece 26 for rotation, and working tool 32 for shaping the workpiece surface 14. With the addition of the rotary encoder 36 coupled to the spindle 22, the relative angle of rotation of the chuck 24 and workpiece 26 about the spindle c-axis may be measured. Thus, by knowing the angle of workpiece rotation and the x-position, these values can be plugged into an equation for the z-position of the leading edge 48 of the tool 32, whereby $z=f(x,c)$. This equation is used by the post processor 46 to govern the movements of the working tool 32 to form the workpiece surface 14 with the axis asymmetric "potato chip" and, preferably, also with the axis symmetric spherical or aspherical shape. As another feature, when the rotary table 30 is mounted to the platform 18 for rotation of the working tool 32 about the b-axis, the tool leading edge 48 z-position may further be determined as a function of the tool x-position, the spindle chuck angle of rotation about the c-axis, and the table top angle of rotation about the b-axis, or $z=f(x,c,b)$.

A first portion 50 of the circumferential edge 52 of the workpiece surface 14 is shown in FIG. 4, partially in hidden lines, having an axis symmetric shape that generally resembles a gently sloping parabola. It is to be understood that first portion 50 could have any axis symmetric shape such as a spherical or other aspherical curve. Thus, with the working tool leading edge 48 positioned at the first portion 50, as the chuck 24 rotates the workpiece 26, the z-position of the leading edge 48 will not change along the first portion 50 (ignoring the slight amount of workpiece material removed during the partial turn). Likewise, a second portion 54 of the circumferential edge of the workpiece surface 14 shown in FIG. 4 has an axis asymmetric "potato chip" shape with both a convex section 56 and a concave section 58 when viewed in the z-direction from the working tool 32. Unlike with the first portion 50, the working tool leading edge 48 positioned at the second portion 54 will vary in z-position as the chuck 24 rotates the workpiece 26. The leading edge 48 will undulate as the working tool 32 encounters the convex and concave sections 56, 58. Depending on the desired properties of the workpiece surface 14, such as optical focal characteristics, the axis symmetric first portion 50 and the axis asymmetric second portion 54 may extend inward from the circumferential edge 52 across the workpiece surface 14 for a specified distance. Also, the system 10 may be configured to simultaneously form the axis symmetric first portion 50 and axis asymmetric second portion 54.

Figure 5:
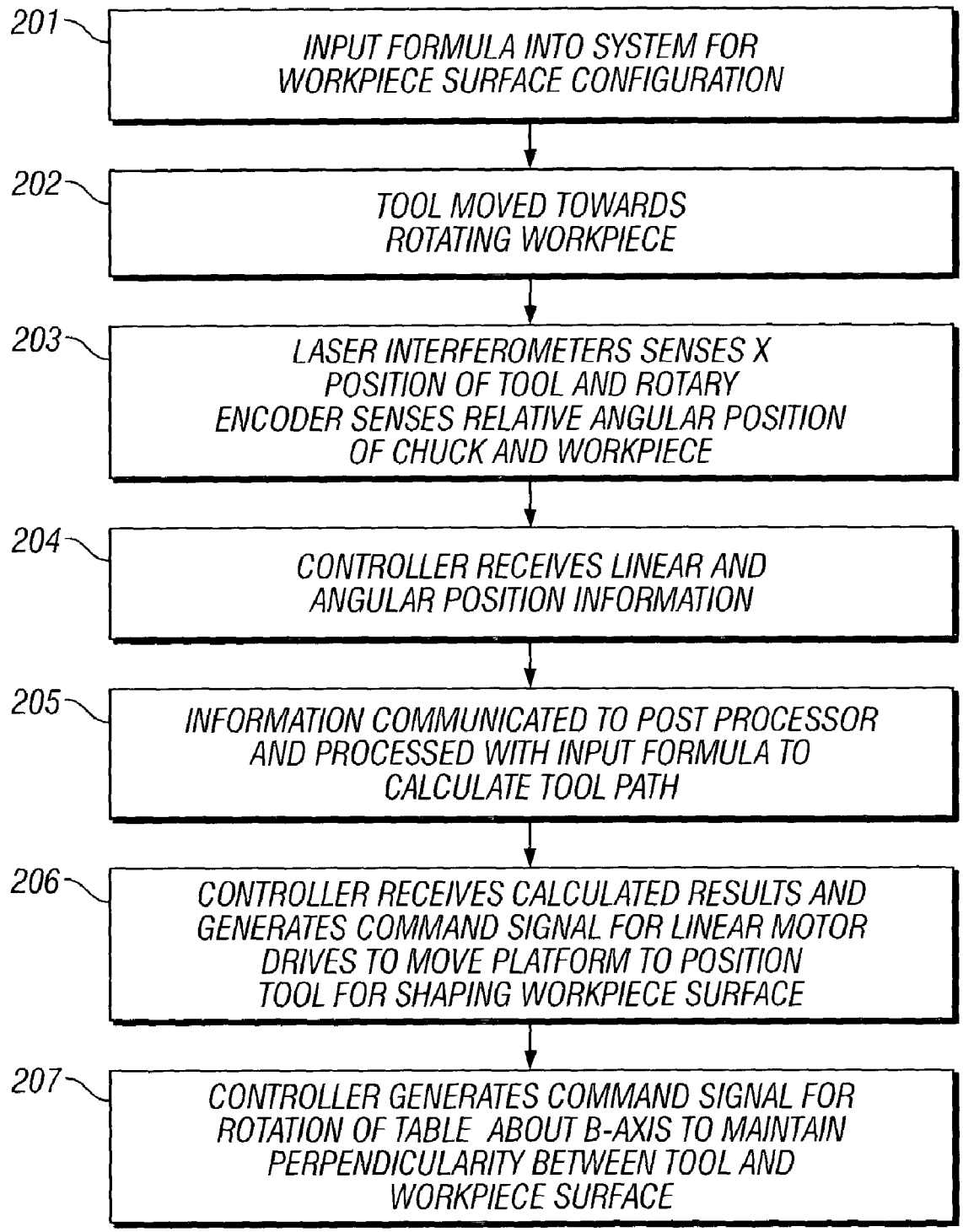
FIG. 5 is a flowchart of a method of the present invention for machining surfaces with an axis asymmetric portion.

A method of practicing the present invention is depicted in the flowchart of FIG. 5. At step 201, a formula is inputted to the system 10 corresponding to surface equations for the workpiece surface 14 to be shaped in an axially asymmetric configuration, and optionally to be shaped to have an axis symmetric portion. The formula could be pre-programmed into the system 10 and stored in a memory or added in real time by the user. The working tool 32 is then moved in the x-z plane by the linear motor drives 40 toward the rotating workpiece surface 14 held by the chuck 24 of the spindle assembly 22, at step 202. At step 203, the laser interferometers 42 measure the x-position and the z-position of the leading edge 48 of the tool 32 while the rotary encoder 36 simultaneously senses the relative angular position of the chuck 24 and workpiece 26. The controller 44 then receives the linear and angular position information from the laser interferometers 42 and rotary encoder 36, respectively, in step 204. At step 205, this information is then communicated to the post processor 46, which takes the input or pre-programmed formula and position information and uses the position information variables to calculate a single point working tool 32 centerline path, and the grinding spindle centerline path if provided. The controller 44 then receives the calculated results from the post processor 46 at step 206, and generates a command signal for the linear motor drives 40 to move the platform 18 and attached table 30 to appropriately position tool 32 for shaping the workpiece surface 14. Steps 203 through 206 are repeated until the workpiece surface 14 is fabricated to the desired specifications. At optional step 207, the controller 44 generates command signals for rotation of the table 30 about the b-axis to maintain perpendicularity of the tool 32 relative to the workpiece surface 14.

In a preferred mode of operation, the system 10 of the present invention operates the spindle chuck 24 at a rotational speed that is compatible with the frequency response of the z-slide servo and the number of sinusoidal undulations required for each revolution. As discussed earlier, the frequency response is a function of the available thrust of the slide drive system, the mass of the slides, and the dynamic range of z-slide travel required to machine the asymmetric portion of the particular workpiece.

The slow tool servo system allows for long travel. The travel is only limited by the travel of the z-axis slide which is typically 10 inches or greater. The spindle speed must be lowered to accommodate the reduced frequency response of the slide, but such workpieces can be made if necessary.

As an example, the present invention is ideally suited for diamond turning of nickel plated substrates to form molds that are used to produce axis-asymmetric, aspherical, plastic optical elements of between 0.1 and 10 inches in diameter. Diamond grinding according to system 10 is also well suited for making molds for glass parts out of tool steel or tungsten carbide.

The invention thus attains the objects set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

Having described the invention, what is claimed is:

1. A method of forming a workpiece with a shaped workpiece surface having at least a portion that is axially asymmetric, the method comprising the steps of:
   providing a tool assembly and a spindle assembly,
      the spindle assembly (a) securing said workpiece, (b) being rotatable about a spindle axis, and (c) having a rotary encoder to provide angular position feedback of the workpiece relative to the tool assembly,
      the tool assembly having
         a first x-axis linear drive for moving said tool assembly in an x-axis orthogonal to the spindle axis,
         a second z-axis linear drive for moving said tool assembly in a z-axis parallel to the spindle axis,
         a tool, and
         a table, rotatable about a table axis, for manipulating an angle of the tool;
   rotating the spindle assembly;
   oscillating the tool assembly in at least one of the x-axis and the z-axis with respect to the workpiece surface such that the tool selectively removes portions of the workpiece to form the axially asymmetric portion of the workpiece surface by controlling the location of a contact point of the tool and workpiece along the z-axis, the contact point location being a function of an x-axis contact point location and a function of an angle of rotation of the spindle about the spindle axis.

2. The method of claim 1, wherein the slow tool servo assembly further comprises a controller having a processor and wherein the method further comprises the steps of:
   inputting a formula to the processor corresponding to a desired shape for the workpiece surface;
   simultaneously determining a relative angle of rotation of the spindle about the spindle axis, and a relative transverse linear location of at least one of the contact point and the tool; and
   processing the formula, using the relative angle of rotation and the x-axis contact point location, to determine a z-axis location for at least one of the workpiece surface and tool.

3. The method of claim 1, further comprising the steps of:
   predetermining a slope and orientation of the workpiece surface at a specific location; and
   generating a command signal to rotate the table to maintain perpendicularity of the tool relative to the workpiece surface.

4. The method of claim 1, wherein the tool is a grinding wheel.

5. The method of claim 1, wherein the tool is a single point diamond cutting tool.

6. An apparatus for forming an axially asymmetric portion of a workpiece surface, the apparatus comprising:
- a spindle assembly having a spindle for holding the workpiece, the spindle being selectively rotatable about a spindle axis, the spindle assembly having a rotary encoder to provide angular position feedback of the workpiece; and
- a tool assembly having
  - a tool for contacting the workpiece,
  - a first x-axis linear drive for moving said tool assembly in an x-axis orthogonal to the spindle axis,
  - a second z-axis linear drive for moving said tool assembly in a z-axis parallel to the spindle axis, and
  - a table that is movable along the x-axis and the z-axis through the first x-axis linear drive and the second z-axis linear drive, the table being rotatable about a table axis, the tool being mounted to the table.

7. The apparatus of claim 6, wherein the encoder is coupled to the spindle to detect an angle of rotation of the spindle.

8. The apparatus of claim 6 wherein the table is operably configured to maintain a substantially perpendicular relationship between the tool and said workpiece surface.

9. The apparatus of claim 6 wherein the tool is a diamond turning machine.

10. The apparatus of claim 6 wherein the tool is a grinding machine.

11. The apparatus of claim 6, further comprising a controller for controlling at least one of said first x-axis linear drive, second z-axis liner drive and a relative angular rotation of the table.

12. An apparatus for forming an axially asymmetric portion of a workpiece surface, the apparatus comprising:
- a spindle assembly having a spindle for holding the workpiece, the spindle being selectively rotatable about a spindle axis, the spindle assembly having a rotary encoder to provide angular position feedback of the workpiece;
- a tool assembly having
  - a tool for contacting the workpiece,
  - a first x-axis linear drive for moving said tool assembly in an x-axis orthogonal the spindle axis,
  - a second z-axis linear drive for moving said tool assembly in a z-axis parallel to the spindle axis, and
  - a table that is movable along the x-axis and the z-axis through the first x-axis linear drive and the second z-axis linear drive, the table being rotatable about a table axis, the tool being mounted to the table; and
- a processor for receiving the angular position feedback and x-axis position of the tool, and for determining a z-axis position for the tool.

13. The apparatus of claim 12 wherein the processor determines an angle about the table axis to maintain a substantially perpendicular relationship between the tool and said workpiece surface.

14. The apparatus of claim 12 wherein the tool is a diamond turning machine.

15. The apparatus of claim 12 wherein the tool is a grinding machine.

16. The apparatus of claim 13 wherein the processor controls the angle to maintain the substantially perpendicular relationship.

17. The method of claim 1, wherein the table axis comprises a b-axis that is orthogonal to the x-axis and the z-axis.

18. The apparatus of claim 6, wherein the table axis comprises a b-axis that is orthogonal to the x-axis and the z-axis.

19. The apparatus of claim 12, wherein the table axis comprises a b-axis that is orthogonal to the x-axis and the z-axis.

* * * * *